United States Patent
Wendling et al.

(10) Patent No.: US 6,721,629 B2
(45) Date of Patent: Apr. 13, 2004

(54) FOUR WHEEL STEERING ALIGNMENT PROCESS

(75) Inventors: Scott M. Wendling, Montrose, MI (US); Steven Donald Klein, Munger, MI (US); Reeny Sebastian, Saginaw, MI (US); Scott E. Weiss, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 50 days.

(21) Appl. No.: 09/966,219

(22) Filed: Sep. 28, 2001

(65) Prior Publication Data

US 2003/0028288 A1 Feb. 6, 2003

Related U.S. Application Data

(60) Provisional application No. 60/309,434, filed on Aug. 1, 2001.

(51) Int. Cl.[7] .................................................. G05D 3/12
(52) U.S. Cl. ..................... 700/279; 280/86.75; 356/155
(58) Field of Search ........................ 356/155, 139.09; 700/279; 29/407.09; 318/587; 280/86.75; 307/9.1, 10.1

(56) References Cited

U.S. PATENT DOCUMENTS

| | | | | |
|---|---|---|---|---|
| 4,372,407 A | * | 2/1983 | McColl | 180/6.2 |
| 4,629,317 A | * | 12/1986 | January et al. | 356/155 |
| 4,953,648 A | | 9/1990 | Ohmura | 180/79.1 |
| 5,731,870 A | * | 3/1998 | Bartko et al. | 356/139.09 |
| 5,826,319 A | * | 10/1998 | Colwell et al. | 29/407 |

FOREIGN PATENT DOCUMENTS

| | | |
|---|---|---|
| EP | 1 026 068 | 9/2000 |
| JP | 2-37079 | 7/1990 |

* cited by examiner

*Primary Examiner*—Albert W. Paladini
(74) *Attorney, Agent, or Firm*—Michael D. Smith

(57) ABSTRACT

Disclosed is a method for aligning a position sensor in a vehicle with steerable wheels comprising obtaining an absolute position value responsive to a position signal from a handwheel position sensor, obtaining a relative position value responsive to an encoder signal count from a position encoder, and obtaining an index position value responsive to an index position signal. The method further includes receiving an alignment enable signal and determining a correction factor responsive to the relative position value and the index position value. The method for aligning a position sensor is responsive to at least one of the absolute position value, the relative position value, and the index position value under conditions determined from the status of the alignment enable signal. Also disclosed is a method for aligning a steerable wheel in a vehicle with electric power steering comprising obtaining an alignment correction corresponding to a computed correction of wheel position relative to the vehicle from an alignment apparatus, receiving an alignment enable signal, where the method of aligning is responsive to the alignment correction under conditions determined from the status of the alignment enable signal.

75 Claims, 4 Drawing Sheets

FOUR WHEEL STEERING ALIGNMENT PROCESS

CROSS-REFERENCE TO RELATED APPLICATIONS

This application claims the benefit of U.S. provisional application No. 60/309,434 filed Aug. 01, 2001 the contents of which are incorporated by reference herein in their entirety.

BACKGROUND

Motor vehicles having four-wheel steering systems are typically defined by a set of front wheels that are steerable in unison with each other and a set of rear wheels that are likewise steerable in unison with each other. The control of the direction and angle of the steering movement of the rear steerable wheels is dependent upon the steering wheel angle and speed of travel of the motor vehicle. When steering the motor vehicle at low speeds, the rear wheels are generally steered out-of-phase or in the opposite direction of the front wheels, thereby enabling the motor vehicle to articulate turns of a small radius. When steering the motor vehicle at high speeds, the rear wheels are generally steered in-phase or in the same direction of the front wheels.

Electronic power steering systems (EPS) and particularly those employing rear wheel steering provide an electronic means of controlling the direction of a vehicle. Such systems provide advantages such as additional flexibility, configurability, and the ability to tailor the system to a particular vehicle. Many steering systems employ electric motors to facilitate positioning the vehicle wheels and positions sensors to measure the actual position of the motor or wheels or both. In such system ensuring proper alignment of the position sensor with a reference or reference motor position is beneficial to reduce or minimize measurement errors. Thus, an automated alignment process presents an opportunity for improving the steering performance of a vehicle and providing simplified and more accurate manufacturing process.

SUMMARY

A method of aligning a position sensor in a vehicle with steerable wheels comprising obtaining an absolute position value responsive to a position signal from a handwheel position sensor, obtaining a relative position value responsive to an encoder signal count from a position encoder 50, and obtaining an index position value responsive to an index position signal. The method further includes receiving an alignment enable signal and determining a correction factor responsive to the relative position value and the index position value. The method for aligning a position sensor is responsive to at least one of the absolute position value, the relative position value, and the index position value under conditions determined from the status of the alignment enable signal.

A storage medium encoded with a machine-readable computer program code for aligning a position sensor in a vehicle with steerable wheels. The storage medium includes instructions for causing controller to implement method for aligning a position sensor in a vehicle with steerable wheels as described above.

A computer data signal embodied in a carrier wave for aligning a position sensor in a vehicle with steerable wheels. The computer data signal comprising code configured to cause a controller to implement a method for aligning a position sensor in a vehicle with steerable wheels as described above.

A method for aligning a steerable wheel in a vehicle with electric power steering comprising obtaining an alignment correction corresponding to a computed correction of wheel position relative to the vehicle from an alignment apparatus, receiving an alignment enable signal, where the method of aligning is responsive to the alignment correction under conditions determined from the status of the alignment enable signal.

A storage medium encoded with a machine-readable computer program code for aligning a steerable wheel in a vehicle with electric power steering. The storage medium includes instructions for causing controller to implement method for aligning a steerable wheel in a vehicle with electric power steering s as described above.

A computer data signal embodied in a carrier wave for aligning a steerable wheel in a vehicle with electric power steering. The computer data signal comprising code configured to cause a controller to implement a method for aligning a steerable wheel in a vehicle with electric power steering as described above.

DETAILED DESCRIPTION

Disclosed in an exemplary embodiment is a method and system for aligning front and rear wheels in a vehicle employing rear wheel steering. An exemplary embodiment is described herein as providing a method for determining a front wheel angle (FWA) and rear wheel angle (RWA) under selected conditions and performing an alignment procedure for ensuring that at one input sensor is aligned to the front and/or rear wheels of the vehicle.

An exemplary embodiment is described herein by way of illustration as may be applied to a vehicle and more specifically a vehicle steering system. While a preferred embodiment is shown and described, it will be appreciated by those skilled in the art that the invention is not limited to the embodiment and application described herein, but also to any vehicle with steerable wheels and where rear wheel steering is employed. Moreover, while an exemplary embodiment is disclosed and illustrated with reference to a particular implementation, it will be appreciated that such illustration should not be construed as limiting. Those skilled in the art will appreciate that a variety of potential implementations and configurations are possible.

Figure 1:
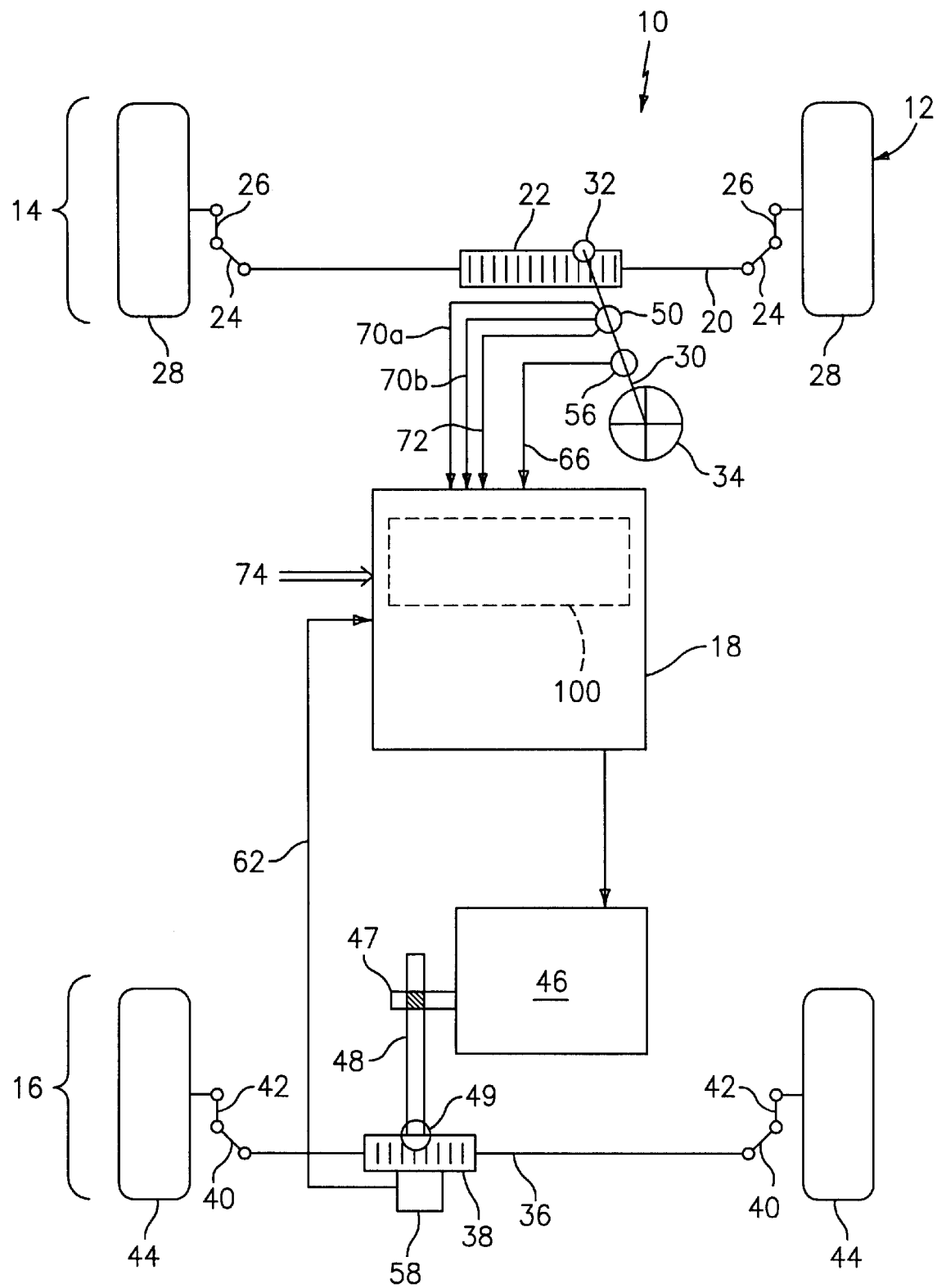
FIG. 1 is a schematic representation of a motor vehicle including front and rear steerable wheels.

Referring to FIG. 1, a partial depiction of a vehicle control system 10, hereinafter referred to as system 10 is provided. The system 10 includes, but is not limited to, a controller 18 coupled to various sensors and interfaces for performing a variety of processes prescribed by the desired controlling functions. FIG. 1 also depicts a vehicle employing rear wheel steering and the apparatus for executing the prescribed steering functions.

System 10 is incorporate into a motor vehicle 12 to provide directional control to motor vehicle 12 and is configurable to enhance steering of the motor vehicle 12. System 10 comprises a front steering mechanism, shown generally at 14, a rear steering mechanism, shown generally at 16, and a controller 18 in communication with front steering mechanism 14 and rear steering mechanism 16. Although system 10 is described as being applicable to a rack and pinion steering arrangement, system 10 can be incorporable into other steering arrangements including, but not being limited to, integral gear steering systems.

Front steering mechanism 14 comprises a rack shaft 20, a front steering rack 22 disposed intermediate opposing ends of rack shaft 20, a tie rod 24 disposed on each opposing end of rack shaft 20, a knuckle arm 26 connected to each tie rod 24, and a front steerable wheel 28 rotatably disposed on each knuckle arm 26. Rack shaft 20, tie rods 24, and knuckle arms 26 are configured such that front steerable wheels 28 can pivot in unison relative to a body of motor vehicle 12 to steer or to effect a change in the direction of travel of motor vehicle 12 while motor vehicle 12 is moving.

Front steering mechanism 14 further comprises a mechanism through which an operator of can effectuate a desired change in the direction of travel of motor vehicle 12. Such a mechanism comprises a steering column 30 disposed in operable communication at one end thereof with front steering rack 22 through a pinion 32 and at an opposing end thereof with a steering device 34. Steering device 34 may be a hand steering wheel. Manipulation of steering device 34, e.g., rotation of the hand steering wheel, causes the axial rotation of steering column 30, which in turn causes the rotation of pinion 32. Rotation of pinion 32, through the engagement of front steering rack 22 and pinion 32, effectuates the lateral translation of front steering rack 22 relative to the body of motor vehicle 12. The lateral translation of front steering rack 22 causes front steerable wheels 28 to angle relative to the body of motor vehicle 12, thereby altering the direction of travel of motor vehicle 12 while motor vehicle 12 is moving.

Rear steering mechanism 16 comprises a rack shaft 36, a rear steering rack 38 disposed intermediate opposing ends of rack shaft 36, a tie rod 40 disposed on each opposing end of rack shaft 36, a knuckle arm 42 connected to each tie rod 40, and a rear steerable wheel 44 rotatably disposed on each knuckle arm 42. Rack shaft 36, tie rods 40, and knuckle arms 42 are configured such that rear steerable wheels 44, like front steerable wheels 28, can be pivoted in unison relative to the body of motor vehicle 12 to steer motor vehicle 12 upon lateral translation of rear steering rack 38.

Rear steering mechanism 16 further comprises a mechanism through which rear steerable wheels 44 can similarly be pivoted. Such a mechanism comprises a motor 46 operably connected to rear steering rack 38 through a drive mechanism 48. Drive mechanism 48, through a pinion 49, transfers the rotational motion of a rotor shaft 47 of motor 46 to linear motion of rear steering rack 38, which effectuates the lateral motion of rack shaft 36 and, ultimately, the pivoting of rear steerable wheels 44. Accordingly, a displacement sensor 58 is used to detect the displacement of rear rack shaft 36, and hence determine the rear steering angle for feedback to the controller 18.

Motor vehicle 12 is further provided with a steering angle sensor 56 for detecting an angular position of steering column 30, and which transmits to controller 18 a handwheel position signal 66 indicative of a handwheel angle and proportionally similar to a front wheel angle. A rear rack shaft displacement sensor 58 detects the displacement of its corresponding rack shaft 36 from a reference position, which is the position in which each rear steerable wheel 44 is aligned and rotatable and transmits a rear wheel angle signal 62 to controller 18. The handwheel position signal 66 and rear wheel angle signal 62 may be derived from a variety of sources including, but not be limited to, various encoders, other position sensors such as potentiometers, synchros, resolvers, magnetic and optical transducers, and the like, including combinations of the foregoing.

Controller 18 is disposed in communication with the various systems of motor vehicle 12. Controller 18 receives informational signals from each of the systems, quantifies the received information, and provides an output command signal in response thereto, in this instance, for example, to the rear steering mechanism 16 through motor 46. Communications, informational signals and commands as such may be employed by controller 18 to facilitate execution of control algorithms including, but not limited to, four wheel steering control, and/or the alignment processes disclosed herein.

In order to perform the prescribed functions and desired processing, as well as the computations therefore (e.g., the execution of the alignment processes, and the like), controller 18 may include, but not be limited to, a processor(s), computer(s), memory, storage, register(s), timing, interrupt (s), communication interfaces, and input/output signal interfaces, and the like, as well as combinations comprising at least one of the foregoing. For example, controller 18 may include signal input signal filtering to enable accurate sampling and conversion or acquisitions of such signals from communications interfaces. Additional features of controller 18 and certain processes therein are thoroughly discussed at a later point herein.

Figure 2:
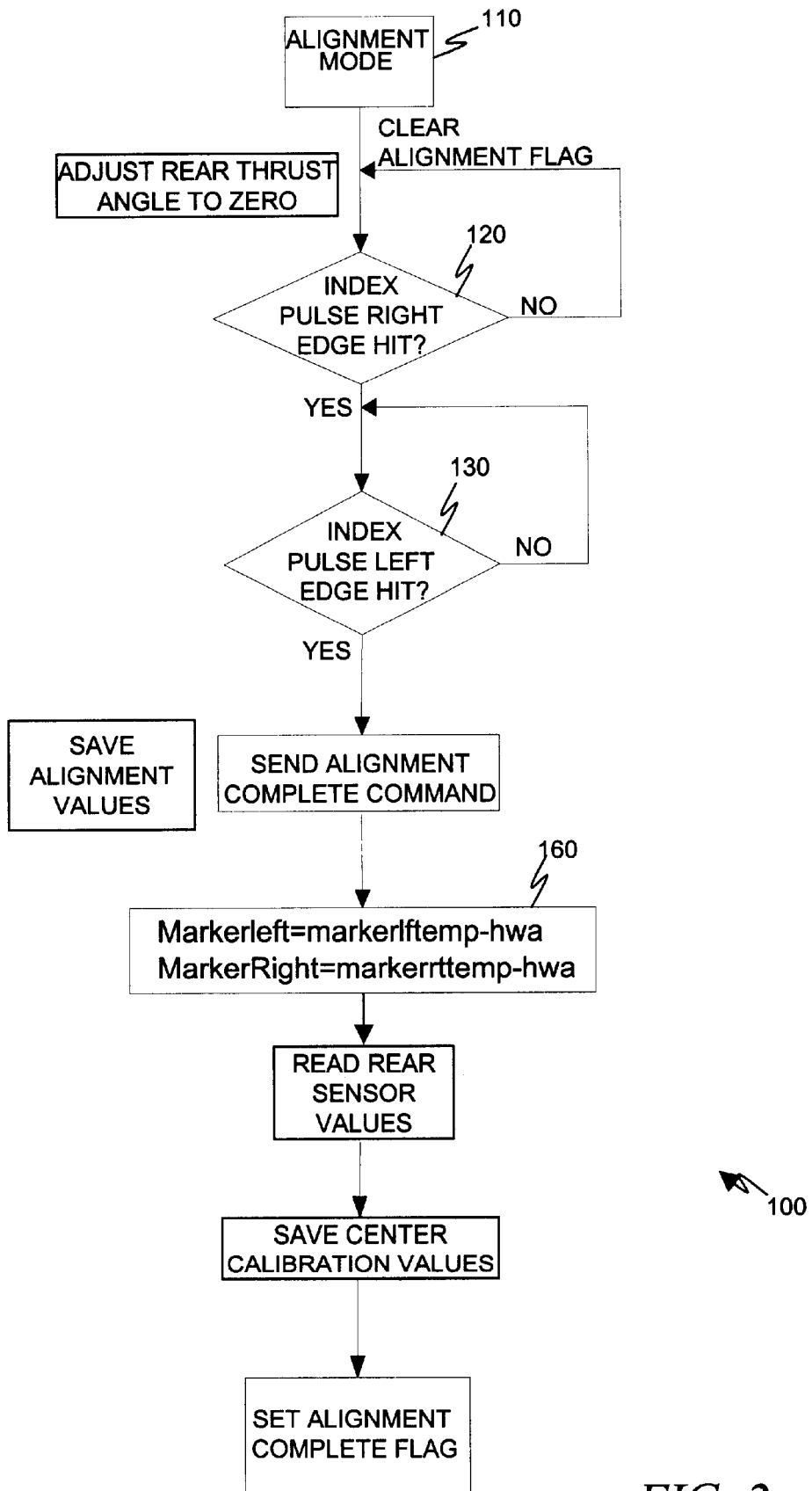
FIG. 2 is a diagram of an exemplary embodiment of a front wheel alignment process.
Figure 3:
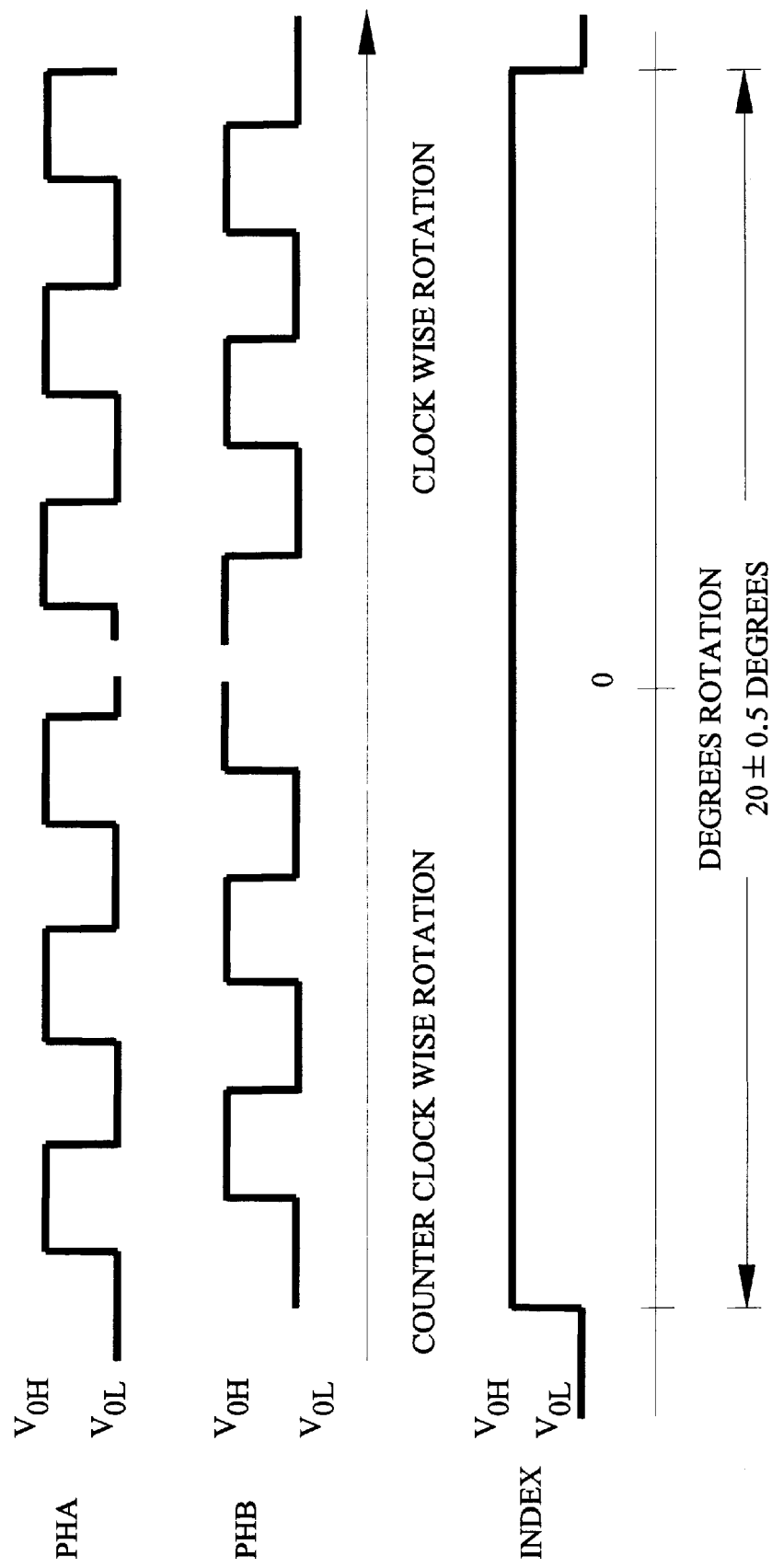
FIG. 3 is a diagram depicting the encoder signals as well as an index signal.

As exemplified in a disclosed embodiment, and as depicted in FIGS. 2 and 3, one such process may be determining from various system measurements, parameters, and states the offset of the front and rear wheels and performing a method for aligning and capturing an offset of a sensor to the front and/or rear wheels of the vehicle. Controller 18 receives various input signals including, but not limited to, those identified above, to facilitate such processing and may provide one or more output signals in response. In an embodiment, the controller 18 obtains as input signals or receives signals to facilitate computing the following, among others: the rear wheel angle signal 62 responsive to and proportional to the rear wheel angle of the motor vehicle 12, two quadrature encoder signals 70a and 70b indicative of the rotation and position of the steering device 34 as well as an index signal 72 indicative of rotation of the steering device 34 within a selected arc length from a selected reference position. Referring to FIG. 3, an exemplary depiction of the encoder signals 70a and 70b as well as the index signal 72 are depicted. The position encoder(s) 50 is configured to ensure that each of the encoder signals 70a and 70b respectively change state for each degree of rotation of the steering device 34 providing one degree of resolution for each signal. It will be appreciated that the resolution for the position encoder(s) 50 and other signals disclosed is illustrative only and various alternative may be possible based upon the position encoder 50 configuration, other sensors employed, signal processing employed, and the like including combinations thereof.

Also received by the controller 18 is the handwheel position signal 66 from steering angle sensor 56 proportional to the rotational position of the steering device 34 and information from an alignment apparatus via a communications interface 74. Information received via the communications interface 74 includes, but is not limited to, a front sensor alignment enable and complete, left and right RWA or thrust angle corrections, an alignment enable messages, and an alignment complete message. Controller 18 generates as an output signal a command to position the rear wheels, which is transmitted to motor 46.

A calibration algorithm 100 is a process executed by controller 18, which generates a calibration value applied to the front wheel commands under selected conditions in response to selected positions signals. Turning now to FIG. 2, an exemplary embodiment of a calibration algorithm is depicted, which employs the encoder signals 70a and 70b as well as the index signal 72 to ascertain from the rotation of the steering device 34 a left and right calibration value hereinafter termed markerleft and markerright. In an exemplary embodiment with a calibration mode enabled, a bi-directional sweep of the steering device 34 is performed while counting the quadrature encoder signals 70a and 70b pulses terminating upon the detection of the active transition of the index signal 72. These counts are then utilized to ascertain an offset or correction term for aligning and calibrating the handwheel position sensor 56 and thus a handwheel position signal 66 with the front steerable wheels 28 of the motor vehicle Continuing with FIG. 2 and the calibration algorithm 100, the process is initiated by entering a calibration "state" as depicted at alignment mode 110 and indicated by the presence of a calibration enable signal, and thereafter counting the occurrences of pulses from each of the quadrature encoder signals 70a and 70b respectively. A bi-directional sweep of the steering device 34 is performed while counting the pulses of the quadrature encoder signals 70a and 70b respectively. The count of the quadrature encoder signals 70a and 70b captured upon the detection of the active transition of the index signal 72 in each direction, yielding a left count value denoted markerlfttemp and a right count value denoted markerrgttemp corresponding to the counter value at the position of the steering device 34 when the index signal 72 transitions. Left index test 130 and right index test 120 cooperate to ascertain when the transition of the index signal has been detected. Following the bi-directional sweep, the steering device is returned to the center position and once again a center counter value denoted hwa captured and saved. It should be noted that the sweep may be manually performed, automated, or a combination thereof to facilitate the prescribed operation. It should also be noted although in the disclosed exemplary embodiment, the bi-directional sweep of the steering device 34 is described and depicted as initiating to the left, the sweep could be initiated to the right as well. In such an instance, the right index test 120 would be performed prior to the left index test 130.

The counted values from each of the quadrature encoders signals 70a and 70b respectively, markerlfttemp, markerrgttemp and the final center position counter hwa are saved and then utilized to ascertain an offset for aligning the front steerable wheels 28 of the motor vehicle 12. To facilitate the alignment a correction factor, which corresponds a left and right alignment correction for the sensor may be calculated. At marker calculation 160, a left correction factor denoted markerleft, and a right correction factor denoted markerright, are determined by subtracting the value of the center position counter hwa from the left count value; markerlfttemp and the right count value; markerrgttemp corresponding to the counter value at the position of the steering device 34 when the index signal 72 transitions. The left and right correction factors now providing a sensor alignment correction, which may be applied for each operational cycle of the vehicle control system 10. In an exemplary embodiment, the quadrature encoders signals 70a and 70b, and subsequently the left and right count values, and finally the left and right correction factors are configured to provide a one degree resolution for each count. Thus, the resulting correction factors represent a correction for the position of the steering device in degrees. It should be evident that while a one-degree resolution has been chosen for the disclosed embodiment, numerous other configurations for the system are feasible and may readily be envisioned and contemplated.

In an exemplary embodiment, a correction is applied when utilizing the handwheel position signal 66 indicative of the rotational position of the steering device 34 by changing the value for position obtained from the handwheel position signal 66 to the saved correction factors (for that particular direction) at the instance of transition of the index signal 72. Thereafter utilizing the encoder signals 70a and 70b to ascertain the relative displacement from the now known position. This process establishes a calibration and reference point for the more accurate higher resolution relative position provided by the high resolution encoder signals 70a and 70b to the absolute position provided by the information in handwheel position signal 66. Hereafter, the position may be accurately determined for the duration of the powered operation by counting and decoding the quadrature encoder signals 70a and 70b. At the next power cycle, the handwheel position signal 66 is once again utilized to initiate steering control processes until with the motion of the steering device 34 resultant from operator inputs, the index signal 72 once again indicates the reference point has been achieved. Once again, the saved correction is substituted for the position signal as disclosed earlier providing an absolute reference point for the encoder signals 70a and 70b.

Figure 4:
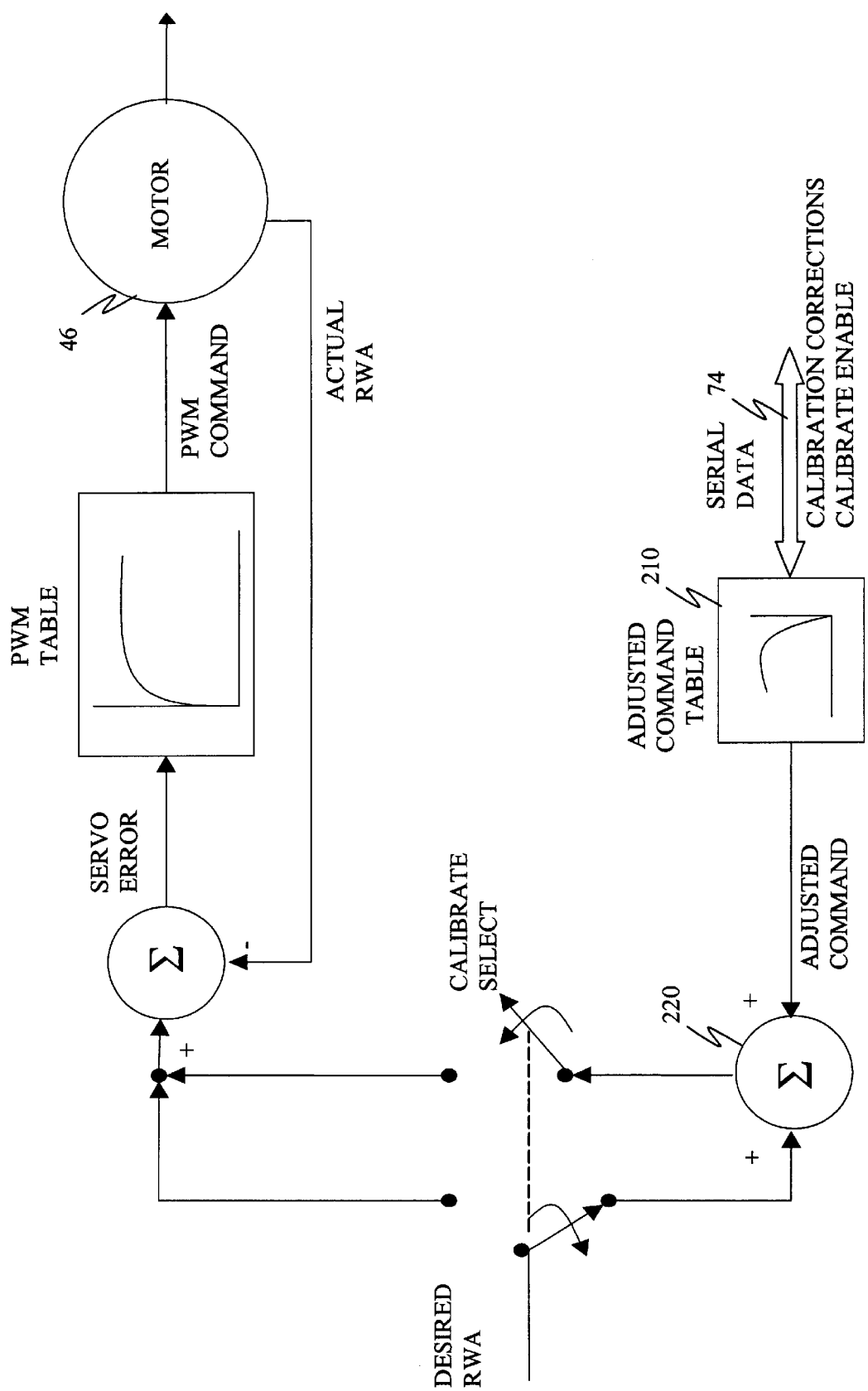
FIG. 4 is a diagram depicting an exemplary embodiment of a rear wheel alignment process.

In yet another exemplary embodiment, an alignment procedure is disclosed for aligning the rear steerable wheels 44 to the motor vehicle 12. Referring to FIG. 4 depicting an exemplary embodiment of a rear wheel alignment method or process. In the exemplary embodiment, an alignment enable indication and alignment correction are transmitted to controller 18 via a communications interface 74. The alignment enable signal provides an indication of entry of an alignment mode. The alignment correction comprising left and right RWA or thrust angle corrections as determined by an alignment apparatus. The alignment apparatus may be that such as commonly employed during vehicle manufacture and service to evaluate and adjust wheel alignment and configured to communicate relevant measurements to controller 18 via the communications interface 74. It is noteworthy to appreciate that the alignment apparatus may further include interfaces and apparatus disposed to facilitate performance of the alignment processes disclosed herein. Such interfaces may include, but not be limited to control mechanisms, vehicle manipulation apparatus, measurement equipment and sensors and the like as well as combinations of the foregoing.

Continuing with FIG. 4, the controller 18 receives RWA corrections, which may then be applied to a compensation process as depicted at 210. The compensation process provides a scaling of the RWA corrections to compensate for inherent system losses such as friction and system lash. In an exemplary embodiment, such compensation provides amplification for small signals tapering off as the magnitude of the RWA correction signal increases. In an exemplary embodiment a look up table is employed to facilitate generating the desired scheduling and amplification. It will be appreciated that other methodologies for implementing the disclosed functions are possible and may include, but not be limited to multiplication, offsets, integration, scheduling, tables, and the like, including combinations of the foregoing.

The compensated commands are then combined with the desired RWA at summer 220 to formulate a composite RWA command. The composite RWA command is utilized in turn, as a command to the motor 46. The motor control depicted generally drives the motor as necessary to achieve the commanded position and thereby, causing the rear wheels to be repositioned at a new position corresponding to the alignment corrections. A feedback control loop may be employed as depicted to drive the motor as required to minimize the alignment corrections. Once the alignment corrections have been achieved, a message is transmitted to controller 18 via the alignment apparatus to indicate that the alignment is complete. Controller 18 saves the new rear wheel position values for future application of the offset to be applied to subsequent desired RWA commands.

The disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention can also be embodied in the form of computer program code, for example, whether stored in a storage medium, loaded into and/or executed by a computer or controller, as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for aligning a position sensor in a vehicle with steerable wheels comprising:
    obtaining an absolute position value responsive to a handwheel position signal from a steering angle sensor;
    obtaining a relative position value responsive to an encoder signal count from a position encoder;
    obtaining an index position value responsive to an index position signal;
    determining a correction factor responsive to said relative position value and said index position value;
    receiving an alignment enable signal; and
    wherein said aligning is responsive to at least one said absolute position value, said relative position value, said index position value, under conditions determined from a status of said alignment enable signal.

2. The method of claim 1 wherein said aligning comprises correcting said absolute position value to a correction factor at an instance of transition of said index position signal and utilizing said encoder signal count to ascertain displacement relative to a known position.

3. The method of claim 1 wherein said correction factor comprises a left correction factor and a right correction factor.

4. The method of claim 1 wherein said determining comprises performing a handwheel sweep from a starting position to a least a left index signal transition and at least a right index signal transition, and thereafter returning to a center position, while ascertaining a relative position value at said left index signal transition, said a right index signal transition, and said center position respectively.

5. The method of claim 4 wherein said correction factor further comprises a difference in said relative position value for said left index signal transition and said center position, and a difference in said relative position value for said right index signal transition and said center position.

6. The method of claim 5 wherein said aligning comprises correcting said absolute position value to a correction factor at the instance of transition of said index position signal and utilizing said encoder signal count to ascertain displacement relative to a known position.

7. The method of claim 6 wherein said correction factor comprises a left correction factor and a right correction factor.

8. The computer data signal of claim 4 wherein said correction factor further comprises a difference in said relative position value for said left index signal transition and said center position, and a difference in said relative position value for said right index signal transition and said center position.

9. The computer data signal of claim 8 wherein said aligning comprises correcting said absolute position value to a correction factor at the instance of transition of said index position signal and utilizing said encoder signal count to ascertain displacement relative to a known position.

10. The computer data signal of claim 9 wherein said correction factor comprises a left correction factor and a right correction factor.

11. The method of claim 1 wherein said correction factor further comprises a difference in said relative position value for said left index signal transition and a center position, and a difference in said relative position value for said right index signal transition and said center position.

12. A method for aligning a steerable wheel in a vehicle with electric power steering comprising;
    obtaining an alignment correction corresponding to a computed correction of wheel position relative to said vehicle from an alignment apparatus;
    receiving an alignment enable signal; and
    wherein said aligning is responsive to said alignment correction tinder conditions determined from a status of said alignment enable signal.

13. The method of claim 12 wherein said alignment correction comprises left wheel angle corrections.

14. The method of claim 12 wherein said alignment correction comprises right wheel angle corrections.

15. The method of claim 12 wherein said alignment correction comprises a left wheel angle correction and a right wheel angle correction.

16. The method of claim 12 wherein said alignment correction comprises rear wheel angle corrections.

17. The method of claim 12 wherein said aligning includes a compensating process to formulate an adjusted correction command.

18. The method of claim 17 wherein said compensating process comprises a lockup table responsive to a magnitude of said alignment correction.

19. The method of claim 17 wherein said aligning includes combining said adjusted correction command with a desired wheel angle to formulaic a composite wheel angle command for commanding a motor.

20. The method of claim 19 wherein said composite wheel angle command drives a motor in a to reduce said alignment correction and thereby said composite wheel angle command.

21. The method of claim 20 wherein said aligning generates and saves an offset for combination with subsequent wheel angle position measurements.

22. The method of claim 21 wherein said alignment correction comprises left wheel angle corrections.

23. The method of claim 22 wherein said alignment correction comprises a left wheel angle correction and a right wheel angle correction.

24. The method of claim 23 wherein said alignment correction comprises rear wheel angle corrections.

25. The method of claim 21 wherein said alignment correction comprises right wheel angle corrections.

26. The computer data signal of claim 20 wherein said aligning generates and saves an offset for combination with subsequent wheel angle position measurements.

27. The computer data signal of claim 26 wherein said alignment correction comprises left wheel angle corrections.

28. The computer data signal of claim 27 wherein said alignment correction comprises a left wheel angle correction and a right wheel angle correction.

29. The computer data signal of claim 28 wherein said alignment correction comprises rear wheel angle corrections.

30. The computer data signal of claim 26 wherein said alignment correction comprises right wheel angle corrections.

31. The method of claim 12 wherein said aligning includes combining said adjusted correction command with a desired wheel angle to formulate a composite wheel angle command for commanding a motor.

32. The method of claim 31 wherein said composite wheel angle command drives a motor in a to reduce said alignment correction and thereby said composite wheel angle command.

33. The method of clam 12 wherein said aligning generates and saves an offset for combination with subsequent wheel angle position measurements.

34. A storage medium encoded with a machine-readable computer program code for aligning a position sensor in a vehicle with steerable wheels, said storage medium including instructions for causing controller to implement a method comprising:
  obtaining an absolute position value responsive to a handwheel position signal from a steering angle sensor;
  obtaining a relative position value responsive to an encoder signal count from a position encoder;
  obtaining an index position value responsive to an index position signal;
  determining a correction factor responsive to said relative position value and said index position value;
  receiving an alignment enable signal; and
  wherein said aligning is responsive to at least one said absolute position value, said relative position value, said index position value, under conditions determined from a status of said alignment enable signal.

35. The storage medium of claim 34 wherein said aligning comprises correcting said absolute position value to a correction factor at an instance of transition of said index position signal and utilizing said encoder signal count to ascertain displacement relative to a known position.

36. The storage medium of claim 34 wherein said correction factor comprises a left correction factor and a right correction factor.

37. The storage medium of claim 34 wherein said determining comprises performing a handwheel sweep from a starting position to a least a left index signal transition and at least a right index signal transition, and thereafter returning to a center position, while ascertaining a relative position value at said left index signal transition, said a right index signal transition, and said center position respectively.

38. The storage medium of clam 31 wherein said correction factor further comprises a difference in said relative position value for said left index signal transition and said center position, and a difference in said relative position value for said right index signal transition rind said center position.

39. The storage medium of claim 38 wherein said aligning comprises correcting said absolute position value to a correction factor at the instance of transition of said index position signal and utilizing said encoder signal count to ascertain displacement relative to a known position.

40. The storage medium of claim 39 wherein said correction factor comprises a left correction factor and a right correction factor.

41. The storage medium of claim 34 wherein said correction factor further comprises a difference in said relative position value for said left index signal transition and a center position, and a difference in said relative position value for said right index signal transition and said center position.

42. A storage medium encoded with a machine-readable computer program code for aligning a steerable wheel in a vehicle with electric power steering, said storage medium including instructions for causing controller to implement a method comprising:
  obtaining an alignment correction corresponding to a computed correction of wheel position relative to said vehicle from an alignment apparatus;
  receiving an alignment enable signal; and
  wherein said aligning is responsive to said alignment correction under conditions determined from a status of said alignment enable signal.

43. The storage medium of claim 42 wherein said alignment correction comprises left wheel angle corrections.

44. The storage medium of claim 42 wherein said alignment correction comprises right wheel angle corrections.

45. The storage medium of claim 42 wherein said alignment correction comprises a left wheel angle correction and a right wheel angle correction.

46. The storage medium of claim 42 wherein said alignment correction comprises rear wheel angle corrections.

47. The storage medium of claim 42 wherein said aligning includes a compensating process to formulate an adjusted correction command.

48. The storage medium of claim 47 wherein said compensating process comprises a lookup table responsive to a magnitude of said alignment correction.

49. The storage medium of claim 47 wherein said aligning includes combining said adjusted correction command with a desired wheel angle to formulate a composite wheel angle command for commanding a motor.

50. The storage medium of claim 49 wherein said composite wheel angle command drives a motor in a to reduce said alignment correction and thereby said composite wheel angle command.

51. The storage medium of claim 49 wherein said aligning generates and saves an offset for combination with subsequent wheel angle position measurements.

52. The storage medium of claim 51 wherein said alignment correction comprises left wheel angle corrections.

53. The storage medium of claim 52 wherein said alignment correction comprises a left wheel angle correction and a right wheel angle correction.

54. The storage medium of claim 53 wherein said alignment correction comprises rear wheel angle corrections.

55. The storage medium of claim 51 wherein said alignment correction comprises right wheel angle corrections.

56. The storage medium of claim 42 wherein said aligning includes combining said adjusted correction command with a desired wheel angle to formulate a composite wheel angle command for commanding a motor.

57. The storage medium of claim 56 wherein said composite wheel angle command drives a motor in a to reduce said alignment correction and thereby said composite wheel angle command.

58. The storage medium of claim 42 wherein said aligning generates and saves an offset for combination with subsequent wheel angle position measurements.

59. A computer data signal embodied in a carrier wave for aligning a position sensor in a vehicle with steerable wheels, said data signal comprising cede configured to cause a controller to implement a method comprising:

obtaining an absolute position value responsive to a handwheel position signal from a steering angle sensor;

obtaining a relative position value responsive to an encoder signal count from a position encoder;

obtaining an index position value responsive to an index position signal; determining a correction factor responsive to said relative position value and said index position value;

receiving an alignment enable signal; and wherein said aligning is responsive to at least one said absolute position value, said relative position value, said index position value, under conditions determined from a status of said alignment enable signal.

60. The computer data signal of claim 59 wherein said aligning comprises correcting said absolute position value to a correction factor at an instance of transition of said index position signal and utilizing said encoder signal count to ascertain displacement relative to a known position.

61. The computer data signal of claim 59 wherein said correction factor comprises a left correction factor and a right correction factor.

62. The computer data signal of claim 59 wherein said determining comprises performing a handwheel swoop from a starting position to a least a left index signal transition and at least a right index signal transition, and thereafter returning to a center position, while ascertaining a relative position value at said left index signal transition, said a right index signal transition, and said center position respectively.

63. The computer data signal of claim 59 wherein said correction factor further comprises a difference in said relative position value for said left index signal transition and a center position, and a difference in said relative position value for said right index signal transition and said center position.

64. A computer data signal embedded in a carrier wave for aligning a steerable wheel in a vehicle with electric power steering, said data signal comprising code configured to cause a controller to implement a method comprising:

obtaining an alignment correction corresponding to a computed correction of wheel position relative to said vehicle front an alignment apparatus;

receiving an alignment enable signal; and wherein said aligning is responsive to said alignment correction under conditions determined from a status of said alignment enable signal.

65. The computer data signal of claim 64 wherein said alignment correction comprises left wheel angle corrections.

66. The computer data signal of claim 64 wherein said alignment correction comprises right wheel angle corrections.

67. The computer data signal of claim 64 wherein said alignment correction comprises a left wheel angle correction and a right wheel angle correction.

68. The computer data signal of claim 64 wherein said alignment correction comprises rear wheel angle corrections.

69. The computer data signal of claim 64 wherein said aligning includes a compensating process to formulate an adjusted correction command.

70. The computer data signal of claim 69 wherein said compensating process comprises a lookup table responsive to a magnitude of said alignment correction.

71. The computer data signal of claim 69 wherein said aligning includes combining said adjusted correction command with a desired wheel angle to formulate a composite wheel angle command for commanding a motor.

72. The computer data signal of claim 71 wherein said composite wheel angle command drives a motor in a to reduce said alignment correction and thereby said composite wheel angle command.

73. The computer data signal of claim 64 wherein said aligning includes combining said adjusted correction command with a desired wheel angle to formulate a composite wheel angle command for commanding a motor.

74. The computer data signal of claim 73 wherein said composite wheel angle command drives a motor in a to reduce said alignment correction and thereby said composite wheel angle command.

75. The computer data signal of clam 64 wherein said aligning generates and saves an offset for combination with subsequent wheel angle position measurements.

\* \* \* \* \*